AUTOMATIC STATION INDICATING DEVICE

Filed June 16, 1949 4 Sheets-Sheet 1

SPRING UP–STATION COVERED

SPRING DOWN–STATION EXPOSED

INVENTOR.
OTTO E. WAGENKNECHT
BY Francis W. Crotty
HIS ATTORNEY

Oct. 30, 1951 O. E. WAGENKNECHT 2,573,291

AUTOMATIC STATION INDICATING DEVICE

Filed June 16, 1949 4 Sheets-Sheet 2

INVENTOR.
OTTO E. WAGENKNECHT
BY Francis W. Crotty
HIS ATTORNEY

AUTOMATIC STATION INDICATING DEVICE

Filed June 16, 1949 4 Sheets-Sheet 3

INVENTOR.
OTTO E. WAGENKNECHT
BY Francis W. Crotty
HIS ATTORNEY

AUTOMATIC STATION INDICATING DEVICE

Filed June 16, 1949

4 Sheets-Sheet 4

INVENTOR.
OTTO E. WAGENKNECHT
BY Francis W. Crotty
HIS ATTORNEY

Patented Oct. 30, 1951

2,573,291

UNITED STATES PATENT OFFICE 2,573,291

AUTOMATIC STATION INDICATING DEVICE

Otto E. Wagenknecht, Chicago, Ill., assignor to Zenith Radio Corporation, a corporation of Illinois Application June 16, 1949, Serial No. 99,511

4 Claims. (Cl. 116—124.1)

This invention relates to radio receivers and the like, and more particularly to an improved device for indicating automatically the call letters of various selected stations throughout the tuning range of the receiver as the receiver is tuned to each of these stations.

The receiver of the present invention includes a plurality of station-identifying strips, formed of metal, cardboard, paper or other suitable material. These strips are mounted side by side on the receiver dial face, and have the call letters of selected stations within the tuning range of the receiver respectively inscribed thereon. These strips are normally covered by masks conveniently formed by the end portions of a series of indexing springs suitably mounted so that, when the receiver is tuned to a particular one of the aforementioned selected stations, the corresponding mask disappears from view exposing the call letters of this station.

It is, accordingly, an object of this invention to provide an automatic station-indicating device for use in radio receivers and the like to enable such receivers to be tuned quickly and conveniently to a desired station within the tuning band of the receiver.

Another object of this invention is to provide an improved station-indicating device that is simple and inexpensive to construct, and which enables the receiver to be quickly tuned to any desired one of a large number of predetermined stations within the receiver tuning range, the number of these stations greatly exceeding the number that may be economically set up in many prior art devices.

Yet another object of this invention is to provide an improved station indicating device in which new desired stations may be quickly and conveniently set up in the device to replace other previously desired stations.

The features of this invention which are believed to be new are set forth with particularity in the appended claims. The invention itself, however, together with further objects and advantages thereof may best be understood by reference to the following description when taken in conjunction with the accompanying drawings, in which:

Figure 1:
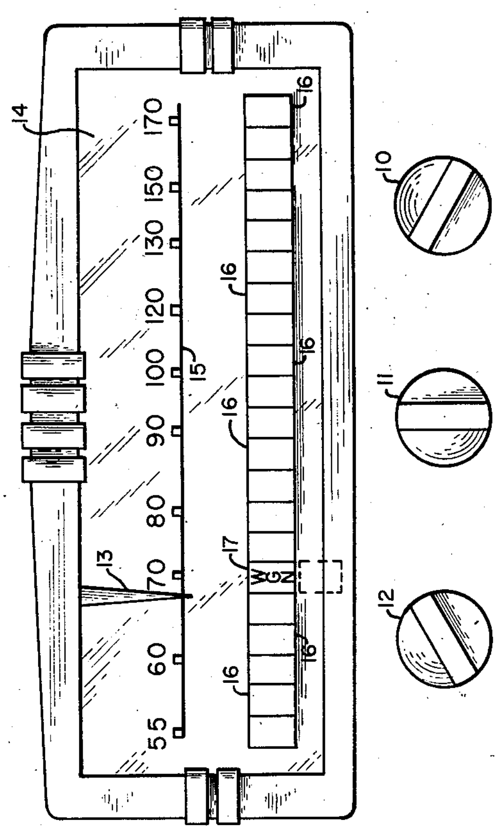
Figure 1 shows a panel of a radio receiver incorporating the invention.

Referring now to Figure 1, the panel of a radio receiver shown therein includes a tuning knob 10, and various other control knobs 11 and 12 for controlling the tone and volume of the receiver, or for making other usual adjustments thereto. The receiver may be tuned from one end of its tuning band to the other by rotation of the knob 10 which causes a pointer 13 to move along a scale 15 inscribed on the dial face 14. A series of indexing springs are mounted in the receiver, in a manner to be described hereafter, so that their respective end portions 16 cover a corresponding series of strips 17 mounted side by side on the dial face 14. The call letters of selected stations within the receiver tuning band are inscribed on the strips 17 and when the receiver is tuned to any one of these selected stations, the end of the indexing spring corresponding to this particular station automatically disappears from view exposing the strip bearing the station's call letters.

Figure 2:
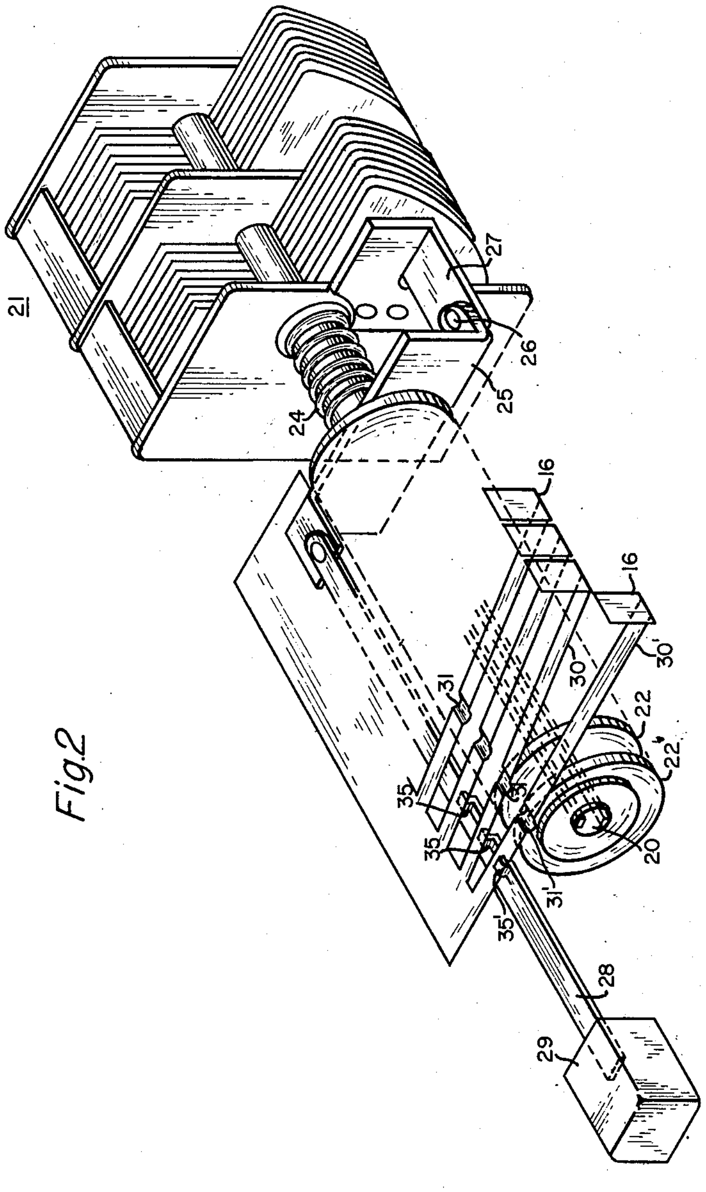
Figure 2 shows in perspective one embodiment of the proposed station-indicating device.
Figure 3:
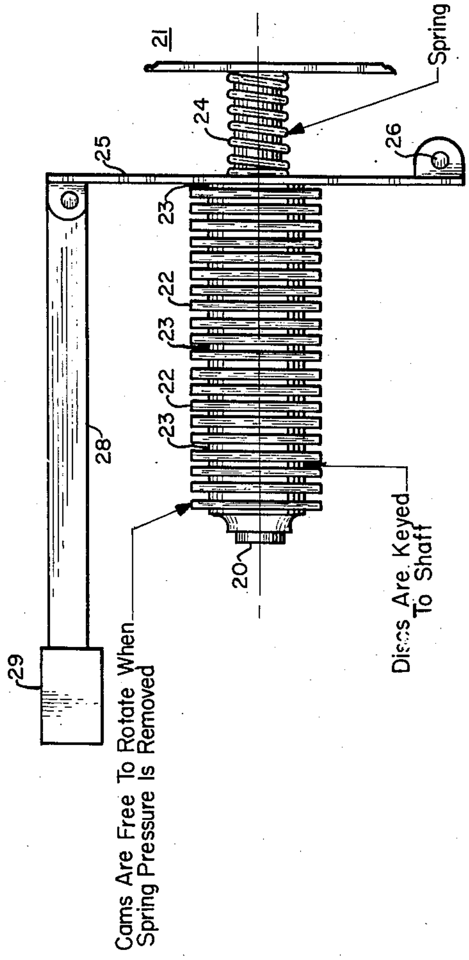
Figure 3 shows an indexing cam assembly of the device.

As shown in Figures 2 and 3 the station-indicating device of the present invention is mounted to be controlled by the shaft 20 of the tuning capacitor assembly 21 of the radio receiver. Rotation of the tuning knob 10 of Figure 1 causes the shaft 20 to rotate, thereby varying the capacity of the capacitor assembly 21 to tune the receiver through its tuning band. A series of slotted cams 22 are frictionally mounted on the shaft 20 and are separated from one another by a plurality of spacer disks 23 keyed to this shaft. A spring 24 is mounted on the shaft 20 having one of its extremities bearing against the housing of the capacitor assembly 21 and its other extremity bearing against a clamping member 25. The member 25 is pivoted by means of a pin 26 on a bracket 27, this bracket being mounted on the housing of the assembly 21. The spring 24 urges the member 25 against the end disc 23 and holds the discs and cams in firm engagement one with the other to prevent rotation of the cams about the shaft 20. The member 25 is linked to an arm 28 extending parallel to the shaft 20. A button 29 is mounted at one extremity of the arm 28 and extends through the receiver cabinet. This button may be actuated to release the spring tension from the discs 23 and cams 22 to allow rotation of the cams about the shaft 20, for reasons to be described.

Figure 4A:
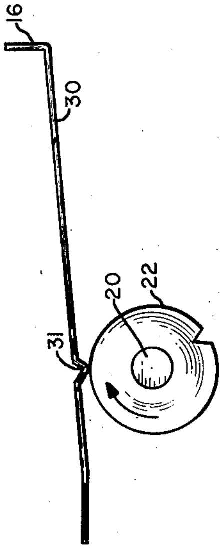
Figures 4A and 4B show portions of various indexing springs utilized in the device.
Figure 4B:
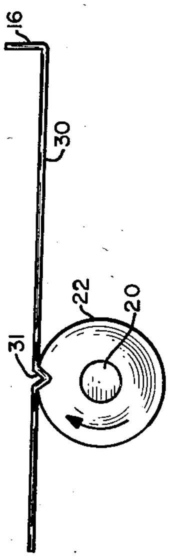

A plurality of indexing springs 30, each having a cam-follower portion in the form of a V-bend 31, are mounted to ride on the respective peripheries of the cams 22. The end portions 16 of the indexing springs are sufficiently weighted so that when the V-bend of one of the springs engages the slot of its corresponding cam, the end 16 drops exposing the call letters of the station tuned by the particular setting of the tuning capacitor 21. This action is clearly shown in Figures 4A and 4B. Figure 4A shows the position of an indexing spring 30 when its V-bend 31 is riding on the periphery of a cam 22, and in this position end 16 is up, covering the corresponding strip 17 of Figure 1. Figure 4B shows the position of an indexing spring 30 when its V-bend 31 engages the slot of the cam 22, and in this position the end 16 is down, exposing the corresponding strip 17.

To set up the indicating device for the various selected stations in the frequency range of the receiver, it is merely necessary to turn the knob 10 of Figure 1 until one of the strips 17 is exposed. Assume that with this setting indexing spring 30′ of Figure 2 is in the down position and all the other indexing springs 30 are in their up position. For this position of the spring 30′, its masking end portion 16 is in the down position, and its V-bend 31′ engages the slot of the associated cam 22′. The call letters of any one of the selected stations may now be inscribed on the exposed strip. The button 29 is then actuated, moving the arm 28 longitudinally and releasing the pressure of the spring 24 from the cams 22 so that they may be rotated about the shaft 20. The arm 28 has a series of projections 35 formed therein. These projections normally do not engage the indexing springs 30, but the longitudinal movement of this arm causes these projections to pass under the indexing springs 30. In this latter position, the projections 35 hold all of the springs 30 and their end portions in the up position with the exception of the single spring 30′. The spring 30′ is held in its down position by the projection 35′ of the arm 28. The knob 10 is now rotated to tune the receiver to the station inscribed on the exposed strip. Although the spring tension has been released from the cams 22, they have sufficient frictional engagement with the shaft 20 that they rotate when the shaft is rotated. However, rotation of the cam 22′ is prevented since it has the V-bend 31′ of the depressed spring 30′ firmly held in its slot by the projection 35′. Consequently, as a result of the rotation of the shaft 20 this cam 22′ is given an angular position on the shaft corresponding to the station indicated on the exposed strip 17. The button 29 is now released and the spring 24 again urges the clamping-arm 25 against the discs 23 to hold the cam 22′ in its pre-set angular position. The projections 35 are now, in the released position of the button 29, out of engagement with the indexing springs and these springs are supported by their corresponding cams. This procedure may be repeated for each one of the cams and indicating springs until all the desired stations have been set up in the device.

Figure 5:
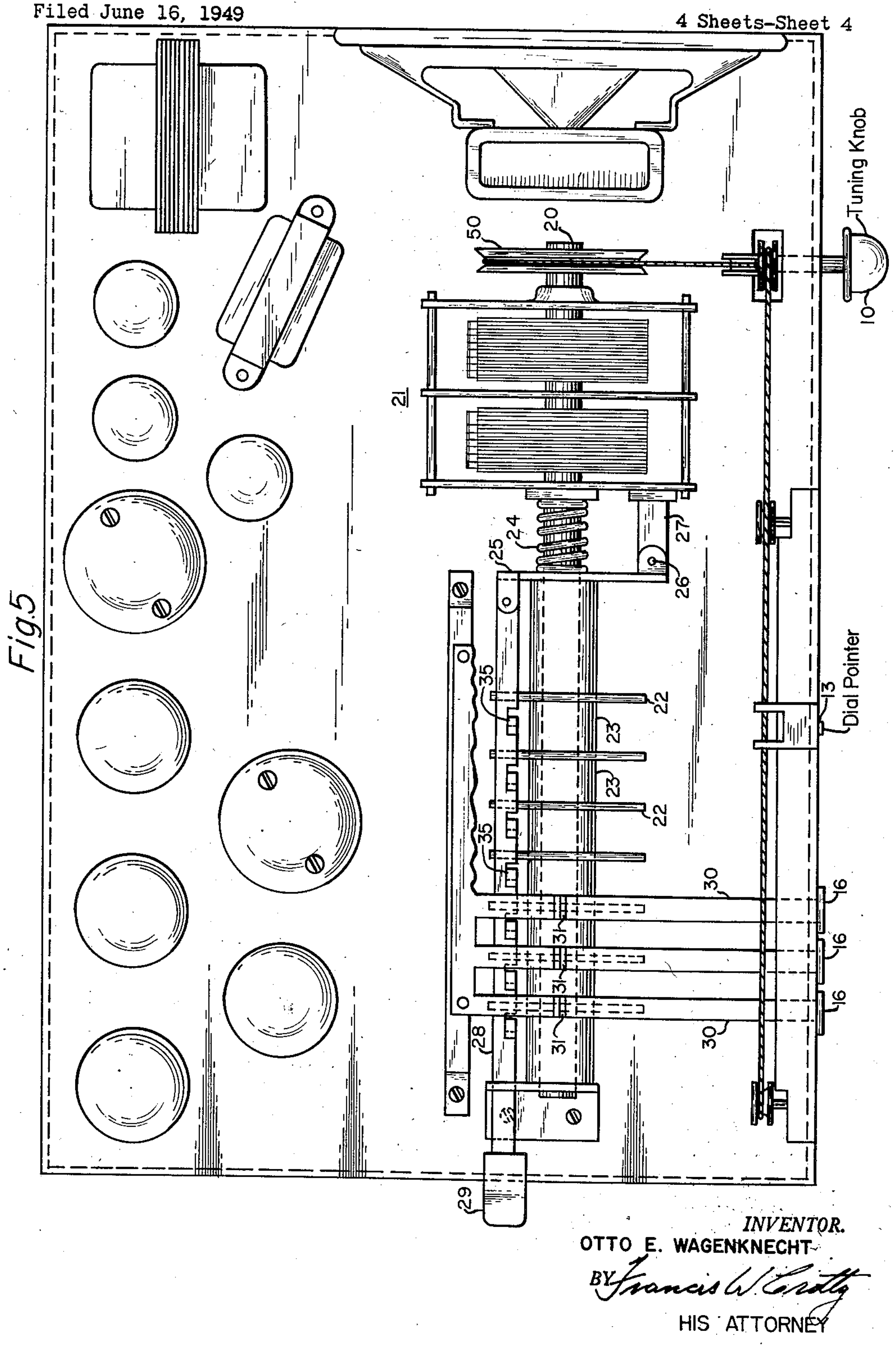
Figure 5 shows a chassis of a radio receiver in which the station-indicating device is mounted.

Figure 5 shows the automatic station-indicating device mounted on the chassis of a radio receiver. Rotation of the knob 10 causes the shaft 20 to rotate due to a pulley and cord arrangement coupled to a disc 50 mounted on this shaft. The button 29 extends through one side of the receiver cabinet, and as described, depression of this button enables as many stations as desired to be set up on the indicating device.

It is apparent that the device may be constructed to indicate a large number of stations merely by the provision of a corresponding number of indexing springs and cams. In this manner, many more stations can be set up on the device than has been heretofore economically possible with many existing push-button tuners and the like. In addition, the desired stations to be indicated by the device may be changed at will by merely tuning the receiver to a previously desired but now undesired station; altering the call letters on its exposed strip to the new desired station; depressing the button 29; and returning the receiver to the desired station.

While a particular embodiment of the invention has been shown and described modifications may be made, and it is intended in the appended claims to cover all such modifications as fall within the true spirit and scope of the invention.

I claim:

1. An automatic station-indicating device for use in conjunction with adjustable tuning means in a radio receiver and the like comprising: a shaft mechanically coupled to said tuning means for rotation upon adjustment of said tuning means; a plurality of cam members frictionally mounted on said shaft and individually having a peripheral slot formed therein for respectively indicating predetermined angular positions of said shaft; a plurality of disc members mounted on said shaft for spacing said cam members from one another; spring means for releasably urging said disc members and said cam members into firm engagement one with the other to prevent rotation of said cam members relative to said shaft; an arm supported for reciprocal movement and coupled to said spring means for releasing said spring means from said disc members and cam members to permit angular adjustment of said cam members relative to said shaft; a corresponding plurality of indexing members supported respectively by the peripheries of said cam members for selective movement upon engagement with said slots; a plurality of strips bearing station-identifying indicia; and a plurality of masks normally masking said strips and mechanically coupled to respective ones of said indexing members to reveal said station-identifying strips upon selective movement of said indexing members.

2. An automatic station-indicating device for use in conjunction with adjustable tuning means in a radio receiver and the like comprising: a shaft mechanically coupled to said tuning means for rotation upon adjustment of said means; a plurality of cam members mounted on said shaft and individually having a peripheral slot formed therein for respectively indicating predetermined angular positions of said shaft; a corresponding plurality of indexing members supported respectively by the peripheries of said cam members and having cam-follower portions shaped to enter the cam slots and end portions shaped to constitute masks; and a plurality of strips bearing station-identifying indicia and positioned to be masked by said masks but revealed upon selective movement of said indexing members in response to seating of said cam follower portions in said cam slots.

3. An automatic station-indicating device for use in conjunction with adjustable tuning means in a radio receiver and the like comprising: a shaft mechanically coupled to said tuning means for rotation upon adjustment of said tuning means; a plurality of cam members frictionally mounted on said shaft and individually having a peripheral slot formed therein for respectively indicating predetermined angular positions of said shaft; a plurality of disk members mounted on said shaft for spacing said cam members from one another; a corresponding plurality of indexing members supported respectively by the peripheries of said cam members for selective movement upon engagement with said slots; spring means for releasably urging said disc members and said cam members into firm engagement one with the other to prevent rotation of said cam members relative to said shaft; an arm disposed across said indexing members and movable from an unlocking to a locking position for releasing said spring means to permit angular adjustment of said cam members relative to said shaft and having locking projections effective in said locking position to lock each index member in its instant relation with respect to its associated cam; a plurality of strips bearing station-identifying indicia; and a plurality of masks normally masking said strips and mechanically coupled to respective ones of said indexing members to reveal said station-identifying strips upon selective movement of said indexing members.

4. An automatic station-indicating device for use in conjunction with adjustable tuning means in a radio receiver and the like comprising: a shaft mechanically coupled to said tuning means for rotation upon adjustment of said tuning means; a plurality of cam members frictionally mounted on said shaft and individually having a peripheral slot formed therein for respectively indicating predetermined angular positions of said shaft; a plurality of disk members mounted on said shaft for spacing said cam members from one another; a corresponding plurality of indexing members supported respectively by the peripheries of said cam members for selective movement upon engagement with said slots; spring means for releasably urging said disk members and said cam members into firm engagement one with the other to prevent rotation of said cam members relative to said shaft; an arm disposed across said indexing members and movable from an unlocking to a locking position for releasing said spring means to permit angular adjustment of said cam members relative to said shaft and having locking projections effective in said locking position to lock each index member in its instant relation with respect to its associated cam; a plurality of strips bearing station-identifying indicia; and means actuated by said indexing members for causing said strips selectively to reveal said station-identifying indicia upon selective movement of said indexing members.

OTTO E. WAGENKNECHT.

REFERENCES CITED

The following references are of record in the file of this patent:

UNITED STATES PATENTS

| Number | Name | Date |
|---|---|---|
| 1,013,895 | Penney et al. | Jan. 9, 1912 |
| 1,532,583 | Guymon | Apr. 7, 1925 |
| 1,964,449 | Carlson | June 26, 1934 |
| 2,310,720 | Wandrey | Feb. 9, 1943 |
| 2,391,470 | May | Dec. 25, 1945 |